United States Patent [19]

Kodaka et al.

[11] Patent Number: 4,871,121
[45] Date of Patent: Oct. 3, 1989

[54] METHOD AND TANK FOR STORING A SUBMARINE OPTICAL CABLE

[75] Inventors: Kazuyuki Kodaka, Tokyo; Mitsuo Kitamura, Kawasaki; Mitsuhiro Motegi, Yokohama, all of Japan

[73] Assignee: Fujitsu Limited, Kawasaki, Japan

[21] Appl. No.: 141,843

[22] Filed: Jan. 11, 1988

[30] Foreign Application Priority Data

Jan. 9, 1987 [JP] Japan ................................. 62-002690
Jan. 9, 1987 [JP] Japan ................................. 62-002691

[51] Int. Cl.⁴ .......................... B68H 17/32; G02B 5/16
[52] U.S. Cl. .................................. 242/54 R; 350/96.23
[58] Field of Search .................. 242/128 X, 129, 54 R; 350/96.23, 96.21 X, 96.22, 96.18, 96.19, 96.20, 96.1; 174/70 R, 70 S, 96, 98, 113 AS, 115, 116, 117 AS

[56] References Cited

U.S. PATENT DOCUMENTS

| | | | |
|---|---|---|---|
| 3,093,333 | 6/1963 | Bishop | 242/128 X |
| 3,202,372 | 8/1965 | Meline et al. | 242/128 X |
| 3,298,631 | 6/1967 | Richardson | 242/129 |
| 4,326,657 | 3/1982 | Arpin et al. | 242/128 X |
| 4,432,605 | 2/1984 | Niiro et al. | 350/96.23 |
| 4,676,590 | 6/1987 | Priaroggia | 350/96.23 |
| 4,690,497 | 4/1987 | Occhini et al. | 350/96.23 |

*Primary Examiner*—Stuart S. Levy
*Assistant Examiner*—John M. Eghtessad
*Attorney, Agent, or Firm*—Staas & Halsey

[57] ABSTRACT

A submarine optical cable provided with optical repeaters and the like is spirally wound as a coil in a cable tank having a wall which defines at least a part of a cable storing space in which the cable is accommodated and is parallel to an axis of the coiled optical cable. A metal plate is provided along and covering an entire peripheral region of the wall to counterbalance induced voltage generated in the coiled optical cable.

18 Claims, 5 Drawing Sheets

METHOD AND TANK FOR STORING A SUBMARINE OPTICAL CABLE

BACKGROUND OF THE INVENTION

1. Field of the Invention

This invention relates to a method for storing a submarine optical cable in a cable tank situated on land or on board a ship.

A submarine communication system using coaxial cables has been widely adopted as a means of international or domestic communication, since this system is superior to a wireless communication system using, for example, communication satellites, or a short wave communication system, because noise or delay time is reduced and a more reliably confidential communication is ensured. Recently, there have been remarkable developments in submarine optical communication systems using an optical cable, because the transmission capacity thereof is larger than that of coaxial cables.

In a submarine optical communication system, to prevent a deterioration of transmission characteristics, and to amplify or reproduce the optical signals transmitted therethrough, submarine optical repeaters are provided at predetermined intervals, for example, 50 km. Each optical repeater is driven by a constant electric current supplied from a power source incorporated in the optical cable itself.

Usually, a submarine optical cable is very long, for example, 1000 km or more, and therefore, a compact means of storing the submarine optical cable on land or on board a ship is desired.

2. Description of the Related Art

In order to store a long submarine optical cable having a length of, for example, 1000 km or more, on land or on board a ship before it is laid in the sea, the cable must be stored in a compact manner, i.e., in as small a space as possible.

Conventionally, a cable tank 16 is situated on land or on board a ship, as shown, for example, in FIG. 10, and a submarine optical cable 10 is accommodated in the cable tank 16 in such a manner that it is spirally wound as a coil to form a plurality, for example, several tens or hundreds, of plane coil layers. On land, the cable tank 16 is constructed under the ground surface, for example, of reinforced concrete, and has a cylindrical coil receiving space defined by a central vertical column 18, a cylindrical peripheral side wall 20, and a horizontal bottom wall 22. In the prior art, the cable 10 is spirally wound in this cable tank 16 in the same direction throughout the entire length thereof, and thus stored in a compact manner.

The submarine optical cable 10 comprises, as shown in FIG. 11, an optical fiber unit 22 including a central core 24 made of copper, a plurality of optical fiber cables 26 spacedly arranged around the central core 24, a silicone rubber portion 28 filled and solidified around the central core 24 and fiber cables 26, inner and outer aluminium layers 50 and 52, which constitute an electrical power supply system, and high-tension resistant cables 54 disposed therebetween.

In the conventional cable storing method, since a submarine optical cable 10 having a length of several hundred kilometers or about 1000 km is spirally wound in the same direction, throughout the entire length thereof, in the cable tank 16 situated on land or on board a ship, the cable 10 constitutes a coil having a self-inductance of several thousands Henry (H) or ten thousand H or more.

Sometimes it becomes necessary to examine the transmission characteristics of the optical cable 10 while it is stored as a coil in the cable tank 16. In that case, an electrical power must be supplied to the optical repeater 12 from the power source 14 through the aluminium layer 50 and 52 of the optical cable 10. Such an examination of the transmission characteristics is carried out while the optical cable 10 is stored in the cable tank 16 situated on land or on board a ship, or when the optical cable 10 is unwound from the tank 16 to be laid in the sea.

Therefore, if a sudden power peak appears when electrical power (constant voltage of a few Amperes) is supplied to the optical cable 10, an extreme change of current may occur and, therefore, an induced high voltage will be generated due to the self-inductance of the coiled submarine optical cable 10. The optical repeater 12 or other such elements connected to the submarine optical cable 10 may be affected and sometimes damaged by this extreme high voltage. Such problems occur not only when a sudden power peak appears at a start of a supply of electrical power, but also when, for example, the cable 10 is disconnected for some reason during the supply of electrical power. In the latter case, a more violent change of current may occur, and thus a higher voltage may be generated due to the self-inductance of the coiled submarine optical cable 10. Thus, there is a possibility that the optical repeaters 12 or the like connected to the cable 10 will be badly damaged.

SUMMARY OF THE INVENTION

An object of the present invention is to provide a method and a tank for storing a submarine optical cable, capable of preventing the generation of a high voltage in the submarine optical cable due to a magnetic inductance of the coiled cable when stored in the tank, to overcome the problems mentioned above.

According to the present invention, there is provided a method for storing a submarine optical cable provided with optical repeaters or the like at predetermined intervals thereof, in such a manner that the optical cable is spirally wound as a coil in a cable tank, characterized in that the cable tank is provided with a wall which defines at least a part of a cable storing space in which the cable is accommodated and is parallel to an axis of the coiled optical cable, a metal plate or cover being provided along an entire peripheral region of the wall.

With this invention, even if an extreme change of electric current occurs, the generation of an induced high voltage in the optical cable is prevented due to a mutual inductance between the metal plate or cover serving as a secondary coil, and the primary coiled optical cable. Therefore, damage to the optical repeaters or the like connected to this optical cable is effectively prevented.

DESCRIPTION OF THE PREFERRED EMBODIMENTS

Figure 1:
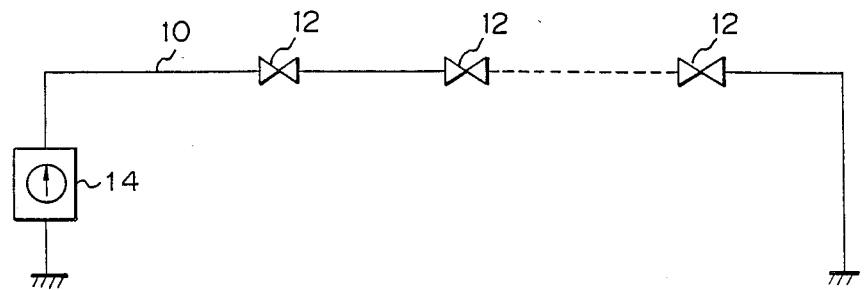
FIG. 1 is a schematic illustration of a communication transmission system using a submarine optical cable.

A communication transmission system using a submarine optical cable is schematically illustrated in FIG. 1, wherein the submarine optical cable 10 is provided with optical repeaters 12 at predetermined intervals of, for example, 50 km, to prevent a deterioration of transmission characteristics, and to amplify or reproduce the optical signals transmitted therethrough. Electrical power having a constant voltage, for example, about 2 A, is supplied from an electrical power source 14 to the optical repeaters 12, which thus are driven by the electrical power supplied thereto. The total length of this submarine optical cable 10 may be, for example, 1000 km or more, and, therefore, a high voltage of several kV, for example, ±7.5 kV, must be applied to the electrical power source 14, which in turn supplies a constant voltage to the optical repeaters 12.

Figure 2:
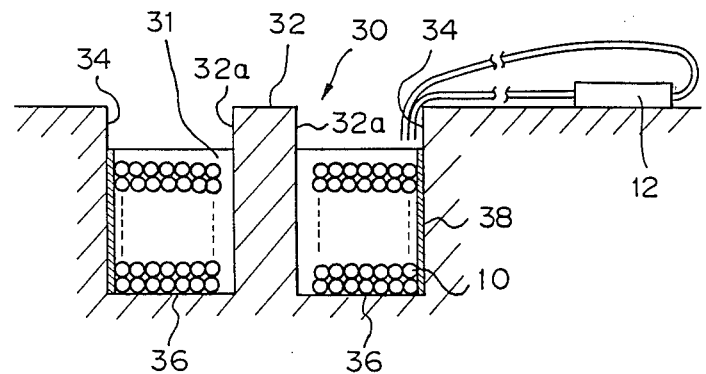
FIG. 2 is a cross-sectional view of a cable tank according to a first embodiment of the present invention.
Figure 10:
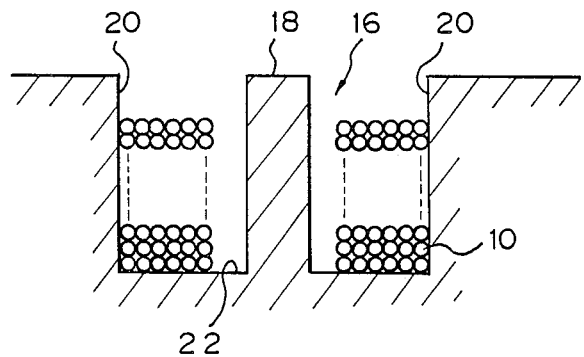
FIG. 10 is a schematic view of a conventionally known cable tank.
Figure 11:
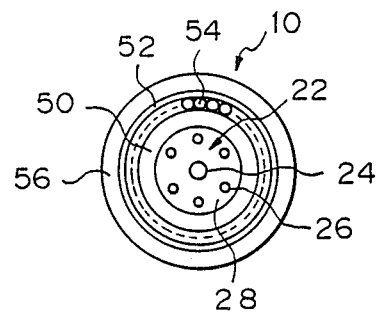
FIG. 11 is a cross-sectional view of a conventionally known submarine optical cable.

FIG. 2 is a cross-sectional view of a cable tank, according to the present invention, for storing a long submarine optical cable 10 before the cable 10 is laid in the sea. This cable tank 30 can be situated on land or on board a ship, in the same manner as a known cable tank, such as shown in FIG. 10. If the cable tank 30 is situated on land, the ground surface is excavated to form a hole having a predetermined cylindrical shape. On the other hand, if the cable tank 30 is situated on board a ship, a hole having a similar shape is formed in the ship's hold.

The cable tank 30 is formed with an annular coil receiving space 31 defined between a central vertical column 32, a cylindrical peripheral side wall 34, and a bottom wall 36 constructed, for example, of reinforced concrete. In one embodiment of the cable tank 30, the depth of the space 31 is 4 to 5 m, the diameter of the vertical column 32 is 3 to 4 m, and the inner diameter of the side wall 34 is about 12 m. According to this invention, a metal plate or cover 38 made of suitable metal having a high electrical capacity, for example, copper, is formed over the entire peripheral surface of the cylindrical wall 34 to cover a region of the surface to at least a height to which the submarine optical cable 10 will reach when accommodated in the cable tank 30.

In the illustrated embodiment, although a metal cover is not formed on the peripheral wall 32a of the central column 32, such a metal cover may be formed thereon instead of providing the metal cover 38 on the cylindrical wall 34. In addition, metal covers 38 may be also provided on the peripheral wall 32a of the central column 32 and on the cylindrical wall 34. Further, such a metal cover may be provided, for example, inside the side wall 34, but adjacent to a surface thereof.

The long submarine optical cable 10 is accommodated in the annular space 31 of the cable tank 30 constructed as mentioned above in such a manner that the cable 10 is first spirally wound on the bottom wall 36 from outside to inside, then spirally wound on the thus-formed first layer from outside to inside, and then wound successively, in the same manner, to form a coil of the submarine optical cable 10 consisting of a plurality of spirally coiled layers thereof. Accordingly, the submarine optical cable 10 having a length, for example, of several hundred kilometers or more, is stored and kept in the cable tank 30 until removed therefrom to construct a submarine optical cable system under the sea.

During the process for accommodating the submarine optical cable 10 in the cable tank 30, or before submarine optical cable 10 is accommodated therein, the optical repeaters 12 are connected to the submarine optical cable 10 at predetermined intervals, for example, every 50 km. As schematically shown in FIG. 2, the optical repeater 12 connected to the cable 10 is drawn out of the annular space 31 and kept adjacent thereto.

Figure 3:
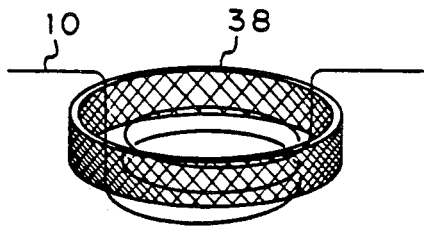
FIG. 3 is a schematic diagram of the first embodiment shown in FIG. 2.

FIG. 3 schematically illustrates a principle of the optical cable storing method according to the present invention. It will be understood that the metal plate or cover 38 serves as a secondary coil, as will be described below in detail.

Since the long submarine optical cable 10 is spirally wound as a coil and stored in the cable tank 30 as mentioned above with reference to FIG. 2, even if an extreme change of current occurs due to a sudden power peak with appears when, for example, an electrical power (constant voltage of a few Amperes) is supplied to the optical cable 10, or when the cable 10 is disconnected during the supply of electrical power, the generation of an induced high voltage in the optical cable 10 is prevented due to a mutual inductance between the secondary coil of the metal cover 38 and the coiled optical cable 10. Therefore, damage to the optical repeater 12 or the like connected to the submarine optical cable 10 due to a surge of high voltage electrical power is effectively prevented.

Figure 4:
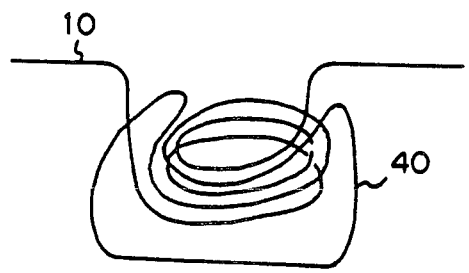
FIG. 4 is a schematic view of a second embodiment of the present invention.

FIG. 4 is schematic diagram of a second embodiment according to the present invention, in which a conductive cable 40 is disposed in the cable tank 30 and, preferably, spirally wound together with the submarine optical cable 10; one end of the conductive cable 40 being connected to the other end thereof to form a secondary coil. Thus, the generation of an induced high voltage in the optical cable 10 is prevented due to a mutual inductance between the conductive cable 40 and the submarine optical cable 10, in the same manner as in the previous embodiment. Therefore, an effect of preventing the generation of an induced high voltage is further improved by adding such a conductive cable 40 spirally wound together with the optical cable 10 in the cable tank 30 having the structure shown in FIG. 2. The length and material, etc., of the conductive cable 40 are not particularly limited.

Figure 5:
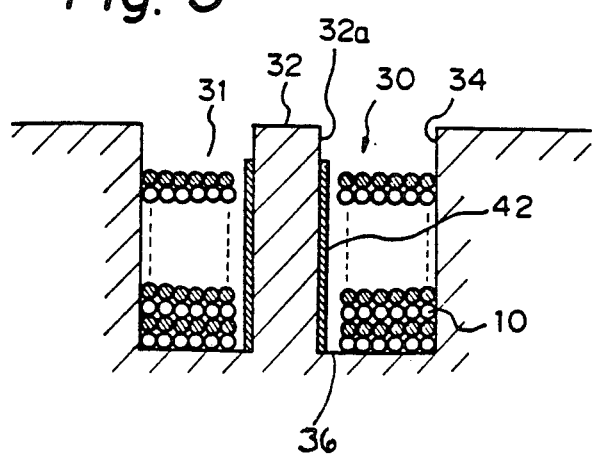
FIG. 5 is a cross-sectional view of a cable tank according to a third embodiment of the present invention.

FIG. 5 is a cross-sectional view of a third embodiment according to the present invention, in which the cable tank 30 has an annular storing space 31, a central vertical column 32, and a cylindrical peripheral wall 34. In this embodiment, a metal cover 42 is provided on the peripheral wall 32a of the central column 32. In FIG. 5, the portions of the optical cable 10 indicated by blank circles are wound in the clockwise direction (right-turn), and the portions indicated by hatched circles are wound in the counter-clockwise direction (left-turn).

In this embodiment, as illustrated in FIG. 5, the submarine optical cable 10 is stored in the cable tank 30 in such a manner that the optical cable 10 is first spirally wound on the bottom wall 36 of the cable tank 30 in one direction to form a first planar coil layer, and then the optical cable 10 is wound in the other direction to form a second planar coil layer. Thus, a plurality of planar coil layers with left and right-turns repeated alternately are stacked in the cable tank 30. Preferably, an even number of layers are stacked in the cable tank 30 in such a manner that the number of left-turn layers is the same as the number of right-turn layers.

Figure 6:
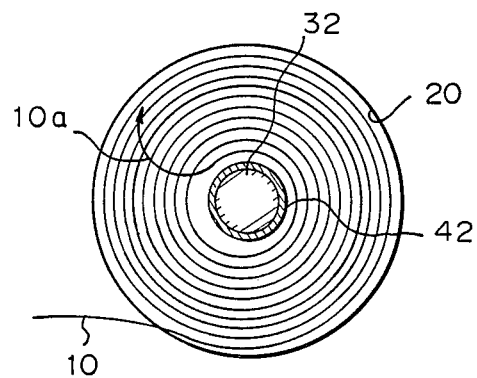
FIG. 6 is a plan view, partly in cross-section, of the cable tank of FIG. 5 showing a cable winding layer.

FIG. 6 is a plan view of the embodiment shown in FIG. 5. The optical repeaters 12 are not illustrated in FIGS. 5 and 6, but are arranged outside of the cable tank 30, as mentioned hereinbefore. As shown in FIG. 6, preferably the optical cable 10 is spirally wound in one direction from the outside to inside, then drawn to the outside to change the winding direction thereof as shown at 10a, and spirally wound again in the other direction from the outside to inside, or vice versa.

According to the third embodiment, as the submarine optical cable 10 is stored in the cable tank 30 in such a manner that the left and right-turns are repeated layer by layer, the self-inductance produced in the left-turn and right-turn layers of cable is counter-balanced, so that the total self-inductance becomes substantially zero. Therefore, even if a sudden power peak appears when electrical power (constant voltage of a few amps) is supplied, when, for example, a transmission test is conducted, or even if the cable 10 is cut or disconnected, an induced high voltage due to self-inductance does not occur. Therefore, damage to the optical repeaters 12 or the like connected to the submarine optical cable 10 is effectively prevented.

Figure 7A:
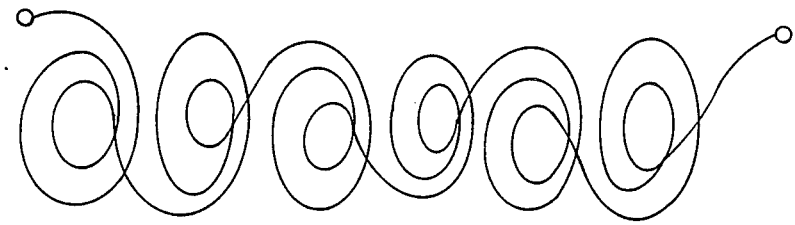
FIGS. 7A and 7B are schematic illustrations showing the windings of the optical cable in the cable tank.
Figure 7B:
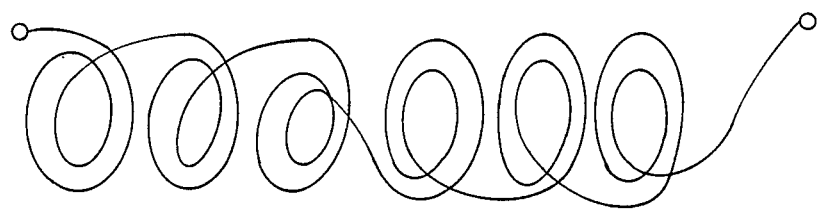

The winding of the submarine optical cable 10 may be such that the left and right-turns are repeated one layer by one layer, as illustrated in FIG. 7A, or repeated every several layers in such a manner that the first several layers of cable are wound in the same direction and the second several layers of cable are wound in the other direction, as illustrated in FIG. 7B. In this case, preferably the number of layers having left and right-turns is substantially the same. In the several layers in which the optical cable 10 is wound in the same direction, preferably the cable 10 is spirally wound from outside to inside and then inside to outside, alternately. In all cases, the coiled optical cable 10 must be stored in the cable tank 30 in such a way that the total number of layers having left and right-turns is substantially the same.

Figure 8:
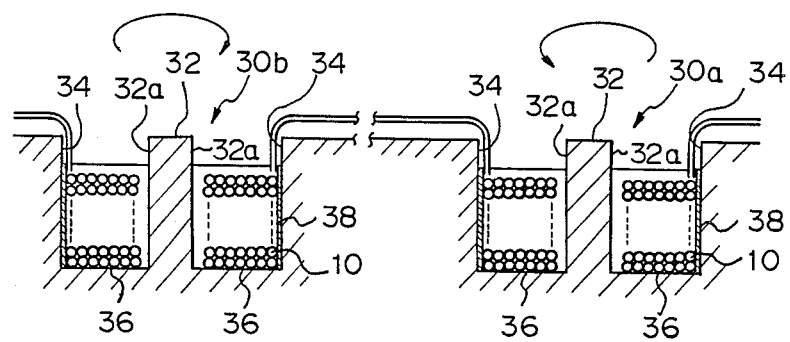
FIG. 8 is a schematic view of a fourth embodiment of the present invention.

FIG. 8 is a schematic illustration of a fourth embodiment according to the present invention, in which a plurality of cable tanks 30a, 30b, . . . , are situated adjacent to each other in the vicinity of the sea shore, or on board a ship. The submarine optical cable 10 is stored in these cable tanks 30a, 30b, . . . , in turn, in such a manner that the cable 10 is wound in one direction, e.g., left-turn, in the tank 30a and in the other direction, e.g., right-turn, in the tank 30b. Preferably, the number of cable tanks 30 having the cable 10 wound in left and right-turns is substantially the same. In this embodiment, the self-inductance produced in the cable in the left-turn tank 30a and the right-turn tank 30b is counter-balanced, in the same manner as in the previous embodiment.

Figure 9:
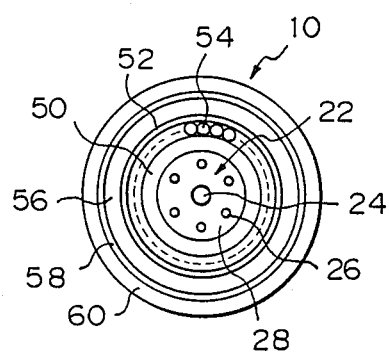
FIG. 9 is a cross-sectional view of a submarine optical cable used in the embodiment of FIG. 8.

FIG. 9 is a cross-sectional view of an embodiment of the submarine optical cable 10 having a shielded cable structure, which is capable of preventing a generation of an induction high voltage when a sudden current change occurs in the optical cable 10. That is, if the shielding of the cable 10 is connected to the ground, the high voltage induced due to the inductance of the coiled cable 10 can be returned to the ground. Also, if the shielding of the cable 10 is used to return supplied electrical power to the ground, this shield can be used as a reverse wound secondary coil, to counterbalance the induced magnetic field therewith.

In FIG. 9, the cable 10 comprises an optical fiber unit 22 including a central core 24 made of copper, and a plurality of optical fiber cables 26 spacedly arranged around the central core 24, and silicone rubber portion 28 filled and solidified around the central core 22 and fiber cables 26. The inner and outer cylindrical aluminium layers 50 and 52 constitute an electrical power supply system and high-tension resistant cables 54 are disposed therebetween. On the outside of the aluminium layer 52 is provided a polyethylene layer 56, which is covered by a metal shield layer 58, which, in turn, is covered by an outer layer 60 made, for example, of polyethylene. The metal shield layer 58 can be used as a conductive cable as mentioned above.

In the embodiments described above, preferably the cable tank 30 storing the optical cable 10 is filled with sea water. If the cable tank 30 is situated in the vicinity of the sea shore or on board a ship, large quantities of sea water can be relatively easily obtained. When the cable tank 30 is filled with sea water, a part of the induced current due to the self induction of the cable 10 is effectively dissipated in the sea water, so that the voltage generated in the optical cable 10 is advantageously reduced.

We claim:

1. A method for storing a submarine optical cable provided with optical repeaters and the like at predetermined intervals, in such a manner that said optical cable is spirally wound as a coil in a cable tank, the method comprising:

coiling said optical cable in said cable tank having a wall which forms at least a portion of a cable storing space in which said cable is accommodated and is parallel to an axis of said coiled optical cable, said coiled optical cable having a self-inductance when supplied with an electric current, and counter-balancing the self-inductance with a metal plate provided along and covering an entire peripheral region of said wall.

2. A method as set forth in claim 1, further comprising filling said cable tank with sea water.

3. A method as set forth in claim 1, further comprising spirally winding a conductive cable together with said submarine optical cable and connecting opposite ends of said conductive cable to each other.

4. A method as set forth in claim 1, further comprising spirally winding said optical cable in one direction and then in another direction, alternately.

5. A method as set forth in claim 4, further comprising spirally winding said optical cable to form a plurality of planar coil layers and changing the winding direction of the optical cable, alternately, from layer to layer.

6. A method as set forth in claim 4, further comprising spirally winding said optical cable to form a plurality of planar coil layers and changing the winding direction of the optical cable, alternately, every several layers.

7. A method for storing a submarine optical cable provided with optical repeaters and the like at predetermined intervals thereof, in such a manner that said optical cable is spirally wound as a coil in each of a plurality of tanks, wherein each of said cable tanks comprises a wall which defines at least a part of a cable storing space in which said cable is accommodated and is parallel to an axis of said coil-like optical cable, the method comprising:

providing a metal plate along and covering an entire peripheral region of said wall; and, changing the optical direction of the optical cable, alternately, at each one or some of said cable tanks.

8. A method as set forth in claim 1, further comprising providing said submarine optical cable with a metal shielding layer.

9. An apparatus for storing a submarine optical cable provided with optical repeaters and the like at predetermined intervals thereof, in such a manner that said optical cable is spirally wound as a coil, said apparatus comprising:

a cable tank having a central vertical column, a peripheral side wall and a bottom wall which define an annular cable storing space in which said optical cable is accommodated, said coiled optical cable having a self-inductance when supplied with an electric current and a first metal plate provided along and covering an entire peripheral region of said side wall and/or said vertical column to counter-balance the self-inductance.

10. An apparatus as set forth in claim 9, wherein said central vertical column, said peripheral side wall and said bottom wall are constructed of reinforced concrete.

11. An apparatus as set forth in claim 10, wherein said first metal plate cover is provided on a surface of at least one of said side wall and vertical column.

12. An apparatus as set forth in claim 10, wherein said metal plate cover is formed inside at least one of said side wall and said vertical column, but spaced from a surface thereof.

13. A method as set forth in claim 2, further comprising providing said submarine optical cable with a metal shielding layer.

14. A method as set forth in claim 3, further comprising providing said submarine optical cable with a metal shielding layer.

15. A method as set forth in claim 4, further comprising said submarine optical cable with a metal shielding layer.

16. A method as set forth in claim 5, further comprising providing said submarine optical cable with a metal shielding layer.

17. A method as set forth in claim 6, wherein said submarine optical cable is provided with a metal shielding layer.

18. A method as set forth in claim 7, wherein said submarine optical cable is provided with a metal shielding layer.

* * * * *

UNITED STATES PATENT AND TRADEMARK OFFICE
CERTIFICATE OF CORRECTION

PATENT NO. : 4,871,121

DATED : October 3, 1989

INVENTOR(S) : Kodaka et al.

It is certified that error appears in the above-identified patent and that said Letters Patent is hereby corrected as shown below:

Col. 4, line 31, "with" should be --which--.

Col. 7, line 12, "optical" (first occurrence) should be --winding--.

Signed and Sealed this

Sixteenth Day of October, 1990

Attest:

HARRY F. MANBECK, JR.

Attesting Officer      Commissioner of Patents and Trademarks